July 14, 1942.　　　E. A. SANTON　　　2,290,074

PICKING MECHANISM FOR LOOMS

Filed March 17, 1941　　　2 Sheets-Sheet 1

INVENTOR
ELLIOT A. SANTON
ATTORNEY

July 14, 1942.  E. A. SANTON  2,290,074
PICKING MECHANISM FOR LOOMS
Filed March 17, 1941  2 Sheets-Sheet 2
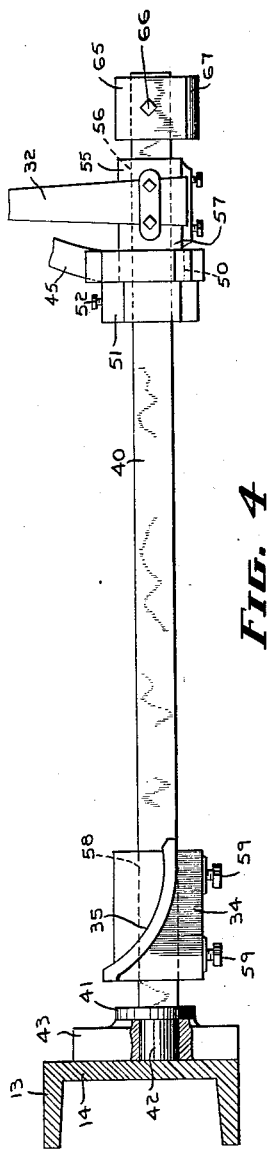
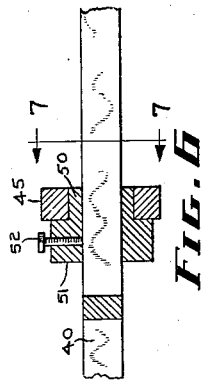
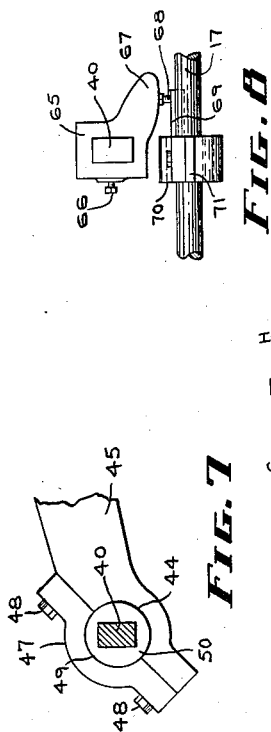
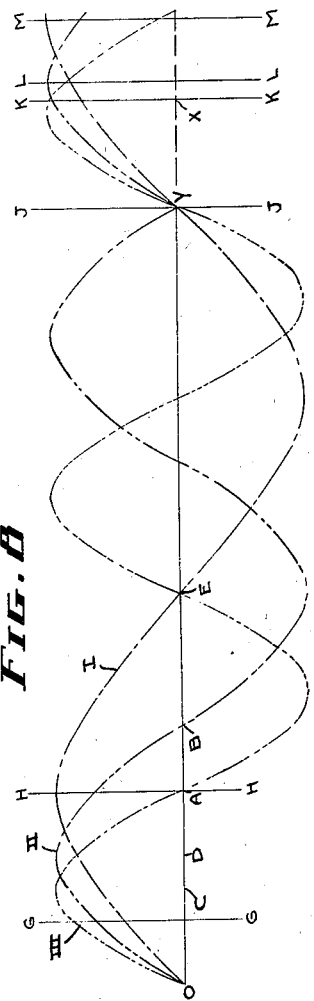
INVENTOR
ELLIOT A. SANTON
ATTORNEY Patented July 14, 1942

2,290,074

UNITED STATES PATENT OFFICE 2,290,074

PICKING MECHANISM FOR LOOMS

Elliot A. Santon, Worcester, Mass., assignor to Crompton & Knowles Loom Works, Worcester, Mass., a corporation of Massachusetts Application March 17, 1941, Serial No. 383,689

5 Claims. (Cl. 139—146)

This invention relates to improvements in picking mechanisms for looms and the general object of the invention is to locate the picking cam in such a position on the picking shaft as to reduce vibration of the latter to a minimum.

In certain types of looms, such for instance as those used in the weaving of woolen and worsteds, it is customary to employ a rotating picking arm on the loom bottom shaft to engage a cam which is mounted on a shaft extending generally parallel to the warp threads and mounted in bearings near its rear and front ends. A picking arm secured to the shaft is operatively connected to the picker stick and the cam is so located on the shaft as to cause rocking of the latter in a direction which will move the picker stick toward the center of the loom. As heretofore constructed the picker shaft has been subject to considerable breakage due to vibrations set up in it incident to the picking operation. In addition to the fundamental vibration the crest of which is midway between the bearings, there are other harmonic vibrations of less amplitude but which are thought to be important contributing factors in the breakage of the picking shaft. It is an important object of my present invention to locate the bearings for the picking shaft and also the picking cam in such positions that the weight of the cam will damp these harmonic vibrations. These vibrations, being of shorter wave length, subject the shaft to more distortion and internal stress than is caused by the fundamental vibration.

It is a further object of my present invention to provide an improved mounting for the forward end of the picker shaft so constructed that the bearing may be held tightly to the loom frame at all times and removal of a picker shaft for repair is effected by longitudinal sliding therealong of a collar which rotates in the bearing.

With these and other objects in view which will appear as the description proceeds, my invention resides in the combination and arrangement of parts hereinafter described and set forth.

Figure 1:
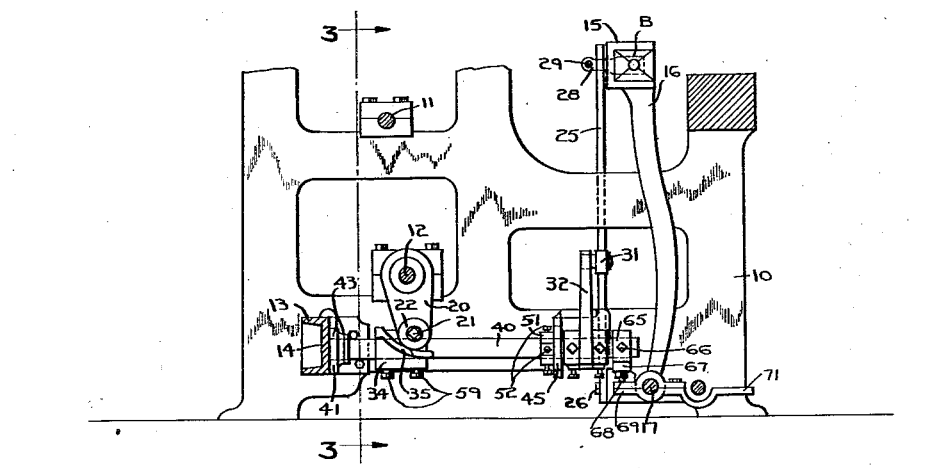
Figure 2:
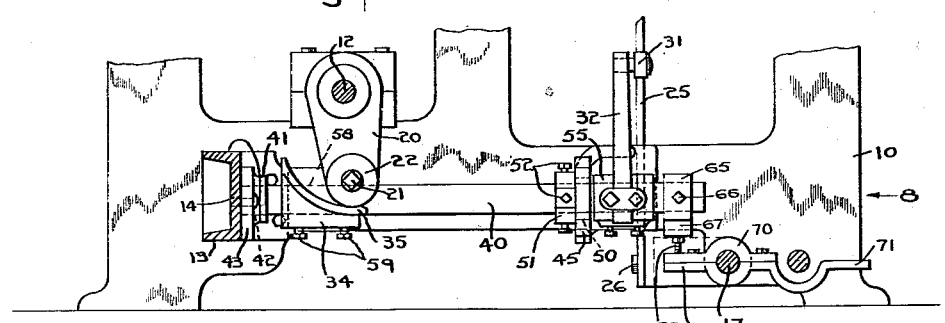
Figure 3:
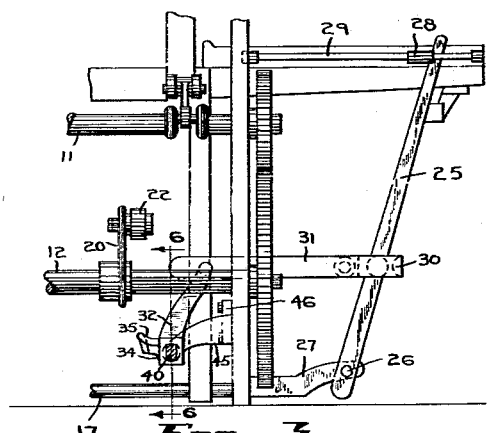

In the accompanying drawings, wherein a convenient embodiment of my invention is set forth, Fig. 1 is a vertical section through a loom looking toward one end thereof and showing my invention, Fig. 2 is an enlarged view of the lower part of Fig. 1, Fig. 3 is an elevation of one end of the loom looking in the direction of line 3—3, Fig. 1, Fig. 4 is a detail side elevation, parts being in section, of the picking shaft and the parts associated therewith forming part of my invention, Fig. 5 is a diagrammatic view showing the relation of the lower harmonic vibrations of the picking shaft with respect to the location of the picking cam, Fig. 6 is an enlarged vertical section on line 6—6, Fig. 3, Fig. 7 is a vertical section on line 7—7, Fig. 6, and Fig. 8 is a detail end elevation in the direction of arrow 8, Fig. 2, showing a form of shuttle ejector which is used with my invention.

In the drawings, the loop frame 10 has top and bottom shafts 11 and 12, respectively, which rotate so that the bottom shaft completes one turn for every two turns of the top shaft. The loom has a rear cross girt 13 secured to the loom frame and provided with a vertical wall 14. The lay 15 is mounted on swords one of which is indicated at 16 and rocks backwardly and forwardly by mechanism not shown around a rocker shaft 17 journaled on the loom frame.

The bottom shaft 12 has secured thereto an arm 20 carrying a stud 21 on which is rotatably mounted a picking roller 22. The picker stick 25 is pivoted as at 26 to a rocker foot 27 mounted on the rocker shaft 17 and extends upwardly to have engagement with a picker 28 which slides along a picker spindle 29 mounted on the lay behind the shuttle box designated generally at B. The lug strap 30 passes around the outer edge of a picker stick and is connected to an inwardly extending sweep stick 31. A picking arm 32 is connected at its upper end to the left hand part of the sweep stick as viewed in Fig. 3 and motion of the arm 32 to the left gives the picker stick an inward picking stroke to propel the shuttle not shown across the loom. The picking cam 34 has a cam face 35 which engages the roll 22 when the picker stick is to be given a picking stroke.

Except as pointed out hereinafter the matter thus far described is of common construction, and it is to be understood that a picking mechanism such as described herein is located at each side of the loom.

The picker arm 32 and cam 34 are secured to a shaft 40 which is under and at right angles to the bottom shaft 12 and is preferably rectangular in cross section, as suggested in Fig. 7. The rear end of shaft 40 is formed with a circular shoulder 41 from which projects a rearward trunnion 42 fitting into a bearing 43 bolted to the vertical web 14 of the girt 13. The forward end of shaft 40 is supported by a half bearing 44 formed on bearing member 45 having a foot 46 which is bolted to the inside of the loom frame, as suggested in Fig. 3. Bearing member 45 has a cap 47 held thereto by bolts 48 and also formed with a half bearing 49. The cap and bearing receive the cylindrical reduced shank 50 of a collar 51 held on shaft 40 by screws 52 and through which extends a rectangular bore 53 to receive shaft 40. The sleeve 50 rotates in the bearing 45 and is the means by which the forward end of shaft 40 is mounted for rotation.

Located in front of bearing 45 and secured to the shaft is the hub 55 of the picker arm 32. Hub 55 is also provided with a rectangular bore 56 to receive the shaft 40 and is preferably located close to the bearing 45. Rearward motion of the shaft is limited by engagement of the shoulder 41 with the bearing 43, while forward motion is limited by engagement of a shoulder 57 on the collar 51 with adjacent portions of bearing 45. The cam 34 is provided with a rectangular bore 58 to provide a snug fit for the shaft 40 and is held to the latter by set screws 59.

The picking shaft is also provided with a shuttle ejector of the type shown in Doherty Patent No. 1,551,246. A lug 65 is held by set screw 66 to the forward extension of shaft 40 and has a lateral finger 57 to receive the upward thrust of a thrust screw 68 carried by an arm 69, which together with its cap 70, rotates about the rocker shaft 17. A forwardly extending pedal 71 is the means by which the weaver can rock shaft 40 in a counter-clockwise direction as viewed in Fig. 3 to move the picker stick toward the center of the loom for the purpose of moving the shuttle out of its box. The lug 65 is adjustable longitudinally along the forward end of shaft 40 and will be located approximately in the relative position with respect to the forward bearing and the hub of the picking arm as shown in Fig. 2.

In operation, rotation of the bottom shaft causes periodic engagement of roller 22 with cam face 35 to cause rocking of the shaft 40 and effect a picking stroke of stick 25 by forces transmitted through arm 32. Any rearward end thrust of shaft 40 due to the direction in which the roll 22 moves will be opposed by the shoulder 41 and the bearing 43. Should it be desired to remove shaft 40 from the loom, cap 46 is removed and screws 52 loosened to permit collar 51 to slide rearwardly along the shaft for a distance equal at least to the length of trunnion 42. The shaft is then moved forwardly until the gudgeon 42 is out of the bearing 43, after which the shaft may be lifted from the half bearing 44 and moved toward the center of the loom clear of its front and back bearings. When the shaft is put back into the loom trunnion 42 will be slipped into bearing 43 and collar 51 slid forwardly on the shaft to enter and rest in half bearing 44. Cap 47 is then tightened in place, and the collar given a final longitudinal adjustment toward its bearing and then tightened in place. The picking arm 32 can be secured to the shaft throughout its removal and replacement.

An important advantage of my invention resides in locating the picking cam 34 in such position with respect to the bearings 43 and 45 as to damp the vibrations to which the shaft 40 is subject during use. The picking arm also has a similar damping effect, but is of less weight than the picking cam and its effect is correspondingly less. The particular location of the cam and picking arm will be better understood with reference to Fig. 5.

In Fig. 5 I have shown graphically the first, second and third harmonic vibrations to which the picking shaft is subject, these vibrations being indicated in the curves I, II and III, respectively. The horizontal line OY is proportioned to the distance between the centers of the rear and front bearings of the shaft and it is apparent that the node E in the first harmonic is half way between points O and Y, nodes B in the second harmonic are located at equal distances from O and Y and from each other, while nodes A in the third harmonic occur at intervals one quarter the length of OY.

The damping effect which the weight of the picking cam has on the harmonic vibrations of the shaft can be considered as focused at the center of gravity of the cam, but the restraining effect which the cam has on these vibrations is due also in part to its longitudinally extending contact with the shaft.

The ideal location of the cam for damping the first harmonic would be with its center at the point A on line OY under the highest point in the curve I, but this point is at the node of the third harmonic and therefore would have no effect in damping the latter. Also, point A corresponds to a value of the second harmonic vibration considerably less than its maximum. If the center of the shaft were located at B on line OY there would be no damping of the second harmonic although there would be some damping of the first and third harmonics. If the center of the cam were at point C there would be maximum damping of the third harmonic and considerable damping of the second harmonic but considerably less damping of the first harmonic.

In moving to the right from point C toward point A a point D is reached at which the damping of all three harmonics is considerable. This point is located near the crest of the second harmonic and between the crests of the first and third harmonics and corresponds to values of the latter which are sufficiently near their maximum values to effect a considerable damping effect on them. The ideal location for the picking cam is therefore with its center of gravity located along the shaft substantially at a point corresponding to D in Fig. 5. Positions at short distances to the right and left of point D however will have large damping effects on all three harmonics.

The body of the picking cam which is in direct contact with shaft 40 is preferably made sufficiently long to contact the shaft throughout the regions in which the crests of the first, second and third harmonics would be manifested. The cam not only acts by its weight to damp the vibrations, but also, being held tightly against the shaft, serves to reinforce the latter along a region thereof which is subject to vibration.

While I have described the left hand part of Fig. 5 I am aware that similar conditions would exist at the right hand end, but the construction of the loom is such that the picking cam must be in the rear position indicated in the drawings because of the location of the bottom shaft. It is apparent however from this diagrammatic figure that the maximum damping effect will be obtained if the picking cam has its center of gravity located at a distance from the center of the rear bearing approximately one-sixth of the distance between the centers of the rear and front bearings. If located at other points toward the longitudinal center of the shaft the weight of the cam might exert considerable damping effect on one of the harmonics but would not exert sufficient damping effect on the other harmonics.

The damping effect is further enhanced by the hub 55 of the picking arm the extent of which along the shaft 40 is represented substantially by the line Y—X in Fig. 5. The three harmonics shown to the right of Y have their crests to the right of the center of gravity of the hub 55 and for this reason the damping effect of the picking arm is less than that caused by the picking cam. The position of the picking arm is determined more or less by the location of the picker stick and while it is subject to some variation it will need to be substantially in the position shown in Figs. 1 and 2. By having the bearing 45 located behind the hub of the picking arm I not only attain the advantages already described with respect to the picking cam, but also secure some damping from vibrations in shaft 40 in front of bearing 45. The right hand part of Fig. 5 shows also that the lug 65 used for retracing the shuttle is favorably located with respect to the crests of the three harmonics. The weight of this part is relatively slight but does exert some damping effect.

In Fig. 5 the space between lines G—G and H—H represents the optimum location for the picking cam, the space between the lines J—J and K—K represents the location of hub 55 of the picking arm, and the space between lines L—L and M—M represents the region on the shaft 40 which is occupied by the lug 65. It will be seen that the regions set off by these pairs of lines are all favorably located for damping vibrations in shaft 40. If bearing 45 were in front of the hub 55 the total length of the shaft between the center of its bearings will be increased and the damping effect of both the cam and the hub 55 would be somewhat less than is the case where the parts are related as shown for instance in Fig. 4.

From the foregoing it will be seen that I have provided a picking shaft and its bearings together with a picking cam so located as to effect maximum damping of the lower and more prominent harmonic vibrations of the shaft. It will further be seen that the center of gravity of the cam is preferably located not far from a point one-sixth of the length of the shaft measured from the rear end of the latter. The vibrations at this specified point are all near their crests and for this reason slight adjustments can be made either in the backward or forward direction to vary the pick without materially altering the damping effect of the shoe on the harmonic vibrations. It will further be noted that the length of the cam and the extent of its contact with the picking shaft extends over a region in which the crests of the first, second and third harmonics are manifested and therefore serve to reinforce the shaft at a point where it would be subjected to strain because of these harmonic vibrations. Furthermore, the hub 55 of the picking arm and the lug 65 are so located as to assist in damping the vibrations, although their effect is thought to be less than that of the picking cam.

Having thus described my invention it will be seen that changes and modifications may be made therein by those skilled in the art without departing from the spirit and scope of the invention and I do not wish to be limited to the details herein disclosed, but what I claim is:

1. In picking mechanism for a loom having a frame which supports a rotatable loom shaft on which is mounted a picking arm, a picking shaft located under and extending substantially at right angles to the loom shaft and having the rear end thereof provided with a circular shoulder beyond which extends a cylindrical trunnion, a bearing on the loom frame into which the trunnion extends and located for engagement with the circular shoulder, a two-part bearing carried by the loom frame adjacent the front end of the picking shaft including a removable cap, a collar mounted for sliding motion on the picking shaft and having a shoulder to engage the rear part of the two-part bearing and having a reduced portion to extend into and rotate within the two-part bearing, releasable means to hold the collar in fixed position on the picking shaft with the shoulder of said collar in engagement with the two-part bearing when the circular shoulder at the rear end of the picking shaft engages the first named bearing, said means when released permitting the collar to slide away from the two-part bearing, and a picking cam mounted on the picking shaft between said bearings in position for engagement with the picking arm.

2. In a picking mechanism for a loom having a frame supporting a rotatable loom shaft to which is secured a picking arm, a picking shaft extending below and substantially at right angles to the loom shaft and having a trunnion at the rear end thereof, a bearing on the loom frame for the trunnion, a circular shoulder adjacent to the picking shaft in front of the trunnion and positioned for engagement with said bearing, a picker cam on said picking shaft in front of said circular shoulder and positioned for engagement with the picking arm, a two-part bearing for the forward end of the picking shaft one part of which is secured to the loom frame and the other part of which constitutes a removable cap, a collar releasably secured to the picking shaft and having a forwardly extending sleeve to enter the two-part bearing and having an enlarged shoulder behind said sleeve for engagement with the two-part bearing when the circular shoulder at the rear end of the picking shaft engages the first named bearing, said collar when released from the picking shaft being slidable rearwardly from the two-part bearing a distance equal at least to the length of said trunnion.

3. In a picking mechanism for a loom having a frame supporting a rotatable loom shaft to which is secured a picking arm, a picking shaft of rectangular cross section extending below and substantially at right angles to the loom shaft and having a cylindrical trunnion on the rear end thereof, a bearing on the loom frame for the trunnion, a circular shoulder on the picking shaft positioned for engagement with said bearing and in front of said trunnion, a picker cam on said picking shaft in front of said circular shoulder and positioned for engagement with the picking arm, a two-part bearing for the forward end of the shaft having one part secured to the loom and having the other part formed as a cap removably held to the first part, and a support member located between the two-part bearing and the picking shaft and having a rectangular bore through which said picking shaft extends, said support member comprising a sleeve extending into and rotatable in said two-part shaft and having a shoulder behind said two-part bearing for engagement therewith, and releasable means to hold said support member on the picking shaft with the shoulder of said support member against the rear part of the two-part bearing when said shoulder is in engagement with the first named bearing, said releasable means when released permitting the support member to slide rearwardly relatively to the picking shaft when the latter is moved forwardly to move the trunnion out of said rear bearing, and removal of said cap permitting the picking shaft to be moved out of the first part of said two-part bearing.

4. In a picking mechanism for a loom having a frame supporting a rotatable loom shaft to which is secured a picking arm, a picking shaft of rectangular cross section extending below and substantially at right angles to the loom shaft, a bearing on the loom frame for the rear end of the picking shaft, a circular shoulder secured to said picking shaft adjacent to the rear end thereof and positioned for engagement with said bearing, a picker cam on said picking shaft in front of said circular shoulder and positioned for engagement with the picking arm, a bearing for the forward end of the shaft supported on the loom frame and having a removable part, a bearing member having a rectangular bore through which said picking shaft extends, a sleeve on said support member extending into and rotatable with respect to said last named bearing and having a shoulder behind said sleeve for engagement with the rear part of the last named bearing, and releasable means to hold the bearing member in fixed position with respect to the picking shaft with the sleeve in said last named bearing, said means when releasable permitting the bearing member to slide rearwardly along the picking shaft, whereupon the picking shaft is movable forwardly with respect to the first named bearing, and the movable part of the second named bearing when detached permitting removal of the picking shaft from the second bearing.

5. A mounting for the picking shaft of a loom having a frame, said shaft being of rectangular cross section, a bearing on the loom frame to receive a cylindrical trunnion on the rear end of said shaft and limit rearward movement of said shaft, a circular bearing mounted on the loom frame for the forward end of the shaft, a bearing member between the shaft and the second named bearing having a rectangular bore to receive said shaft and having also a sleeve to enter and rotate within the second named bearing, said bearing member having a shoulder behind the sleeve for engagement with the second named bearing, releasable means to hold the bearing member in fixed position on the shaft with the sleeve in the second named bearing when said trunnion is in the first named bearing, said means when released permitting rearward movement of the bearing member along the picking shaft to permit forward motion of the latter to disengage the trunnion from the first named bearing, and said second named bearing having a part which is removable to permit movement of said picking shaft away from the second named bearing after the bearing member has been moved rearwardly on said picking shaft.

ELLIOT A. SANTON.